United States Patent
Tahara et al.

(10) Patent No.: US 11,626,967 B2
(45) Date of Patent: *Apr. 11, 2023

(54) RADIO FREQUENCY MODULE AND COMMUNICATION APPARATUS

(71) Applicant: Murata Manufacturing Co., Ltd., Nagaokakyo (JP)

(72) Inventors: Kenji Tahara, Nagaokakyo (JP); Seikoh Ono, Nagaokakyo (JP); Kiyoshi Aikawa, Nagaokakyo (JP); Masanari Miura, Nagaokakyo (JP); Hiromichi Kitajima, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 174 days.

This patent is subject to a terminal disclaimer.

(21) Appl. No.: 17/314,043

(22) Filed: May 7, 2021

(65) Prior Publication Data

US 2022/0021510 A1    Jan. 20, 2022

(30) Foreign Application Priority Data

Jul. 17, 2020   (JP) .............................. JP2020-122867

(51) Int. Cl.
*H04J 3/00*   (2006.01)
*H04L 5/14*   (2006.01)
*H04B 1/16*   (2006.01)

(52) U.S. Cl.
CPC ............. *H04L 5/1469* (2013.01); *H04B 1/16* (2013.01)

(58) Field of Classification Search
CPC ....... H04L 5/1469; H04B 1/16; H04B 1/0057; H04B 1/006; H04B 1/50; H04B 1/0064;
(Continued)

(56) References Cited

U.S. PATENT DOCUMENTS 5,903,820 A * 5/1999 Hagstrom ................ H04B 1/40
                                                                  455/84
7,855,983 B2 * 12/2010 Knecht .................... H04B 1/18
                                                                  370/294

(Continued)

FOREIGN PATENT DOCUMENTS

JP   2006157880 A  *  6/2006 ........... H04B 1/0057
JP   2017-527155 A     9/2017

(Continued)

OTHER PUBLICATIONS

Korean Office Action dated Jun. 19, 2022, in corresponding Korean Patent Application No. 10-2021-0086932.

*Primary Examiner* — Phuongchau Ba Nguyen
(74) *Attorney, Agent, or Firm* — Xsensus LLP

(57) ABSTRACT

A radio frequency (RF) module including a module substrate; a filter with a passband including communication band for TDD; a switch connected to the filter; a power amplifier that is arranged on a first surface of the module substrate and connected to the filter via the switch; a low-noise amplifier that is arranged on a second surface of the module substrate and connected to the filter via the switch; a filter with a passband including communication band; a low-noise amplifier that is arranged on the second surface and connected to the filter; and a conductive member arranged between the low-noise amplifiers on the second surface.

20 Claims, 7 Drawing Sheets

(58) Field of Classification Search
CPC .......... H04B 1/44; H04B 1/56; H04B 7/2656; H03H 9/64; H04W 72/0446; H04W 88/08; H04W 76/02
See application file for complete search history.

(56) References Cited

U.S. PATENT DOCUMENTS

| | | | |
|---|---|---|---|
| 10,797,741 | B2* | 10/2020 | Naniwa ................ H04B 1/00 |
| 10,973,132 | B2* | 4/2021 | Chikita ............. H04B 1/0458 |
| 11,043,925 | B2* | 6/2021 | Kita ..................... H01L 25/18 |
| 11,264,971 | B2* | 3/2022 | Mori ..................... H03H 9/725 |
| 11,309,925 | B2* | 4/2022 | Matsumoto ............ H04B 1/44 |
| 11,411,585 | B2* | 8/2022 | Tada ..................... H04B 1/006 |
| 11,451,249 | B2* | 9/2022 | Nakajima ............... H04B 1/04 |
| 11,463,118 | B2* | 10/2022 | Tada ................ H04B 1/0458 |
| 2010/0265852 | A1* | 10/2010 | Tikka ................ H04B 1/0057 370/278 |

FOREIGN PATENT DOCUMENTS

| | | |
|---|---|---|
| JP | 2019-140670 A | 8/2019 |
| WO | 2018/168500 A1 | 9/2018 |
| WO | 2019/181589 A1 | 9/2019 |

* cited by examiner

RADIO FREQUENCY MODULE AND COMMUNICATION APPARATUS

BACKGROUND

1. Field of the Disclosure

The present disclosure relates to a radio frequency (RF) module and a communication apparatus.

2. Description of the Related Art

In 5th Generation New Radio (5GNR), a communication band for time division duplex (TDD) with a wider bandwidth (hereinafter may also be referred to simply as a TDD band) is available, and studies on the efficient use of such a wideband TDD band are in progress. For example, it has been considered to perform communication by simultaneously using a plurality of component carriers (CCs) in a wideband TDD band (intra-band carrier aggregation) (for example, see Japanese Unexamined Patent Application Publication (Translation of PCT Application) No. 2017-527155).

However, with an RF module of the related art, in simultaneous reception of a plurality of reception signals in the same communication band for TDD, the reception signals may interfere with each other, and the reception sensitivity may be degraded.

SUMMARY

One of the objects of the present disclosure to provide an RF module and a communication apparatus capable of, in simultaneous reception of a plurality of reception signals in the same communication band for TDD, suppressing the interference between the reception signals and improving the reception sensitivity.

According to the present disclosure, there is provided a radio frequency module including: a module substrate with a first main surface and a second main surface on opposite sides of the module substrate; a first filter with a passband including a first communication band for time division duplex (TDD); a first switch connected to the first filter; a first power amplifier that is arranged on the first main surface and connected to the first filter via the first switch; a first low-noise amplifier that is arranged on the second main surface and connected to the first filter via the first switch; a second filter with a passband including the first communication band; a second low-noise amplifier that is arranged on the second main surface and connected to the second filter; and a first conductive member arranged between the first low-noise amplifier and the second low-noise amplifier on the second main surface.

According to embodiments of the present disclosure, in simultaneous reception of a plurality of reception signals in the same communication band for TDD, the interference between the reception signals may be suppressed, and the reception sensitivity may be improved.

Other features, elements, characteristics and advantages of the present disclosure will become more apparent from the following detailed description of embodiments of the present disclosure with reference to the attached drawings.

DETAILED DESCRIPTION

Figure 1:
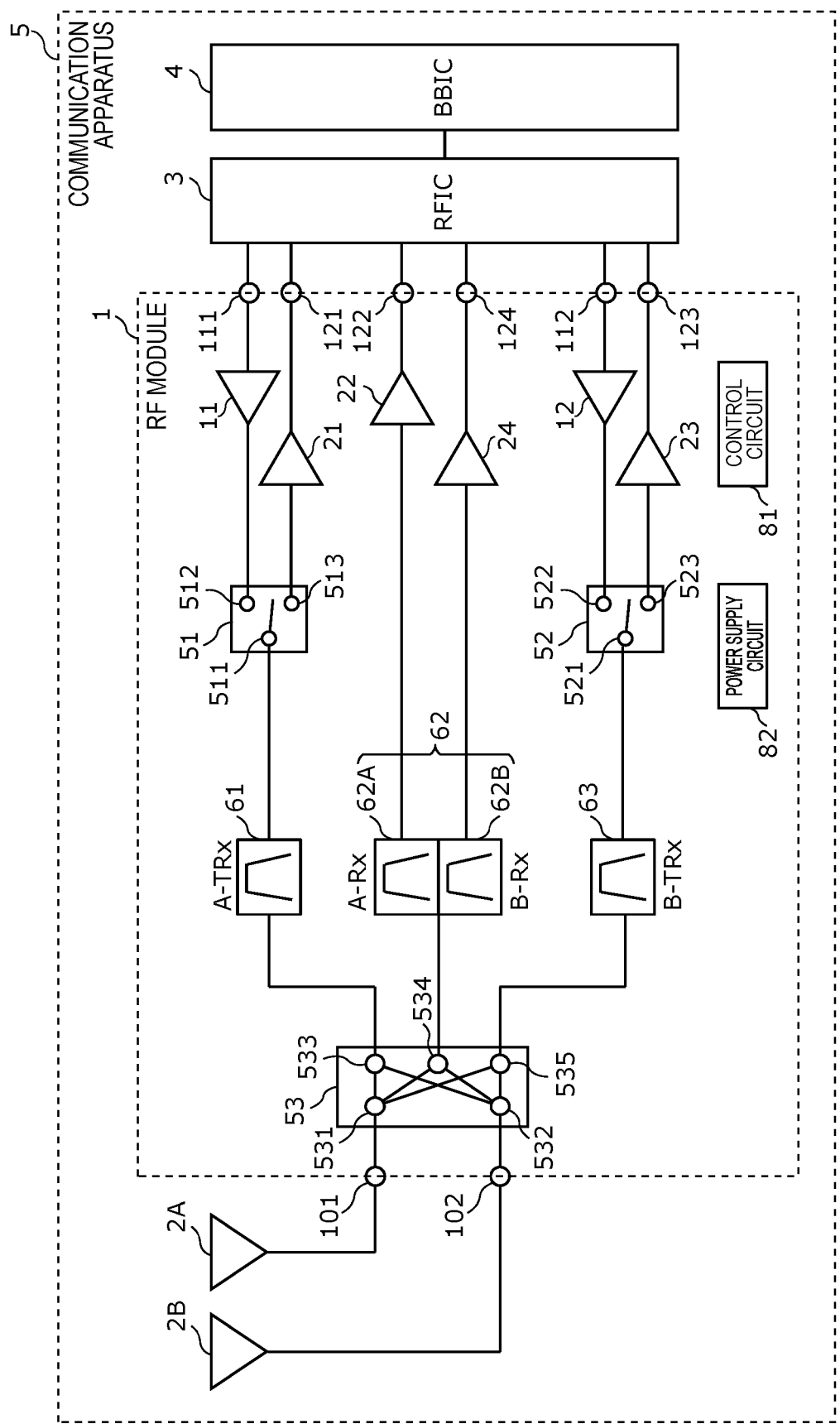
FIG. 1 is a circuit configuration diagram of an RF module and a communication apparatus according to a first embodiment.

Hereinafter, embodiments of the present disclosure will be described in detail using the drawings. The embodiments described below all illustrate comprehensive or specific examples. Numerals, shapes, materials, elements, and the arrangement and connections of the elements discussed in the following embodiments are only exemplary and are not construed to limit the present disclosure.

Note that the drawings are schematic diagrams where emphases, omissions, or ratio adjustments are performed as appropriate in order to illustrate the present disclosure, and they are not necessarily the exact illustrations and may differ from the actual shapes, positional relationships, and ratios. In these drawings, substantially the same configurations are designated by the same reference numerals, and overlapping descriptions may be omitted or simplified.

In the following drawings, the x-axis and the y-axis are axes orthogonal to each other on a plane parallel to the main surfaces of a module substrate. In addition, the z-axis is an axis perpendicular to the main surfaces of the module substrate, and its positive direction indicates an upward direction and its negative direction indicates a downward direction.

In addition, in the circuit configuration of the present disclosure, "being connected" includes not only the case of being directly connected by a connection terminal and/or a wiring conductor, but also the case of being electrically coupled with another circuit element interposed therebetween. In addition, "being connected between A and B" means being connected, between A and B, to both A and B.

In addition, in the module configuration of the present disclosure, "a plan view of the module substrate" means orthographically projecting and seeing an object onto the xy plane from the positive side of the z-axis. "A and B overlap in a plan view of the module substrate" means that at least part of A area that is orthographically projected on the xy plane overlaps at least part of B area that is orthographically projected on the xy plane. "A component is arranged on a main surface of the substrate" includes, in addition to the fact that a component is arranged on the main surface of the substrate while being in contact with the main surface, the fact that a component is arranged above the main surface without being in contact with the main surface, and the fact that a component is embedded from the main surface side into the substrate and arranged in the substrate. "A is arranged between B and C" means that at least one of line segments connecting an arbitrary point in B and an arbitrary point in C passes through A. In addition, terms indicating the relationship between elements, such as "parallel" and "perpendicular", do not only represent the strict meanings, but also include substantially equivalent ranges, such as errors of about several percent.

First Embodiment

1.1 Circuit Configuration of RF Module 1 and Communication Apparatus 5

The circuit configuration of an RF module 1 and a communication apparatus 5 according to the present embodiment will be described with reference to FIG. 1. FIG. 1 is a circuit configuration diagram of the RF module 1 and the communication apparatus 5 according to a first embodiment.

1.1.1 Circuit Configuration of Communication Apparatus 5

At first, the circuit configuration of the communication apparatus 5 will be described. As illustrated in FIG. 1, the communication apparatus 5 according to the present embodiment includes the RF module 1, antennas 2A and 2B, a radio-frequency integrated circuit (RFIC) 3, and a baseband integrated circuit (BBIC) 4.

The RF module 1 transmits RF signals between the antennas 2A and 2B and the RFIC 3. The detailed circuit configuration of the RF module 1 will be described later.

The antennas 2A an 2B are connected to antenna connection terminals 101 and 102, respectively, of the RF module 1, transmit RF signals output from the RF module 1, and receive RF signals from the outside and output the received RF signals to the RF module 1.

The RFIC 3 is an example of a signal processing circuit that processes an RF signal. Specifically, the RFIC 3 performs signal processing, such as down-converting, of an RF reception signal input via a reception path of the RF module 1, and outputs a reception signal generated by the signal processing to the BBIC 4. In addition, the RFIC 3 performs signal processing, such as up-converting, of a transmission signal input from the BBIC 4, and outputs an RF transmission signal generated by the signal processing to a transmission path of the RF module 1. In addition, the RFIC 3 includes a controller that controls switches and amplifiers of the RF module 1. Note that some or all of the controller functions of the RFIC 3 may be implemented outside the RFIC 3, such as in the BBIC 4 or the RF module 1.

The BBIC 4 is a baseband signal processing circuit that performs signal processing using an intermediate frequency band lower than RF signals transmitted by the RF module 1. Exemplary signals processed by the BBIC 4 include image signals for displaying images, and/or audio signals for conversations using a loudspeaker.

1.1.2 Circuit Configuration of RF Module 1

Next, the circuit configuration of the RF module 1 will be described. As illustrated in FIG. 1, the RF module 1 includes power amplifiers 11 and 12, low-noise amplifiers 21 to 24, switches 51 to 53, filters 61, 62A, 62B, and 63, a control circuit 81, a power supply circuit 82, the antenna connection terminals 101 and 102, RF input terminals 111 and 112, and RF output terminals 121 to 124.

The antenna connection terminals 101 and 102 are connected to the antennas 2A and 2B, respectively.

The RF input terminals 111 and 112 are terminals for receiving RF transmission signals from outside the RF module 1. Specifically, the RF input terminal 111 is a terminal for receiving transmission signals in communication band A for TDD from the RFIC 3. In addition, the RF input terminal 112 is a terminal for receiving transmission signals in communication band B for TDD from the RFIC 3.

A communication band means a frequency band defined by a standardization organization (such as the 3rd Generation Partnership Project (3GPP) or the Institute of Electrical and Electronics Engineers (IEEE)) for a communication system. A communication system means a communication system configured using radio access technology (RAT). As the communication system, for example, a 5GNR system, a Long-Term Evolution (LTE) system, and a wireless local area network (WLAN) system may be used, but these are not the only possible communication systems.

Communication bands A and B are examples of a first communication band and a second communication band, respectively. In the present embodiment, band n77 for 5GNR is used as communication band A, and band n79 for 5GNR is used as communication band B. Note that the combination of communication band A and communication band B is not limited to the combination of bands n77 and n79. For example, instead of band n77, band n78 may be used as communication band A. In addition, communication bands A and B may be communication bands for different communication systems. For example, a combination of arbitrary two of the frequency bands for 5GNR, LTE, and WLAN may be used as communication bands A and B. In addition, a millimeter-wave band greater than or equal to 7 GHz may be used as communication bands A and/or B.

The RF output terminals 121 to 124 are terminals for providing RF transmission signals to the RF module 1. Specifically, the RF output terminals 121 and 122 are terminals for supplying reception signals in communication band A to the RFIC 3. In addition, the RF output terminals 123 and 124 are terminals for supplying reception signals in communication band B to the RFIC 3.

The power amplifier 11 is an example of a first power amplifier, and is connected to the filter 61 with the switch 51 interposed therebetween. The power amplifier 11 is capable of amplifying a transmission signal in communication band A, received at the RF input terminal 111, and transmitting the amplified signal to the filter 61.

The power amplifier 12 is an example of a second power amplifier, and is connected to the filter 63 with the switch 52 interposed therebetween. The power amplifier 12 is capable of amplifying a transmission signal in communication band B, received at the RF input terminal 112, and transmitting the amplified signal to the filter 63.

As each of the power amplifier 11 and the power amplifier 12, a multistage amplifier and/or a differential amplifier may be used, but these are not the only possible amplifiers serving as the power amplifiers 11 and 12.

The low-noise amplifier 21 is an example of a first low-noise amplifier, and is connected to the filter 61 with the switch 51 interposed therebetween. The low-noise amplifier 21 is capable of amplifying a reception signal in communication band A, which is input from the antenna connection terminal 101 or 102 via the switch 53, the filter 61, and the switch 51. The amplified reception signal in communication band A, which is amplified by the low-noise amplifier 21, is output to the RF output terminal 121.

The low-noise amplifier 22 is an example of a second low-noise amplifier, and is connected to the filter 62A. The low-noise amplifier 22 is capable of amplifying a reception signal in communication band A, which is input from the antenna connection terminal 101 or 102 via the switch 53 and the filter 62A. The amplified reception signal in communication band A, which is amplified by the low-noise amplifier 22, is output to the RF output terminal 122.

The low-noise amplifier 23 is an example of a third low-noise amplifier, and is connected to the filter 63 with the switch 52 interposed therebetween. The low-noise amplifier 23 is capable of amplifying a reception signal in communication band B, which is input from the antenna connection terminal 101 or 102 via the switch 53, the filter 63, and the switch 52. The amplified reception signal in communication band B, which is amplified by the low-noise amplifier 23, is output to the RF output terminal 123.

The low-noise amplifier 24 is an example of a fourth low-noise amplifier, and is connected to the filter 62B. The low-noise amplifier 24 is capable of amplifying a reception signal in communication band B, which is input from the antenna connection terminal 101 or 102 via the switch 53 and the filter 62B. The amplified reception signal in communication band B, which is amplified by the low-noise amplifier 24, is output to the RF output terminal 124.

The filter 61 (A-TRx) is an example of a first filter, and has a passband including communication band A. Accordingly, the filter 61 is capable of allowing transmission signals and reception signals in communication band A to pass through, and attenuating transmission signals and reception signals in other communication bands not overlapping communication band A. Specifically, the filter 61 has two input/output terminals. One of the two input/output terminals of the filter 61 is connected to the antenna connection terminal 101 or 102 with the switch 53 interposed therebetween, and the other one of the two input/output terminals of the filter 61 is connected to the power amplifier 11 or the low-noise amplifier 21 with the switch 51 interposed therebetween.

The filter 62A (A-Rx) is an example of a second filter, and has a passband including communication band A. Accordingly, the filter 62A is capable of allowing reception signals in communication band A to pass through, and attenuating reception signals in other communication bands not overlapping communication band A. Specifically, the filter 62A has an input terminal and an output terminal. The input terminal of the filter 62A is connected to the antenna connection terminal 101 or 102 with the switch 53 interposed therebetween, and the output terminal of the filter 62A is connected to the low-noise amplifier 22.

The filter 62B (B-Rx) is an example of a fourth filter, and has a passband including communication band B. Accordingly, the filter 62B is capable of allowing reception signals in communication band B to pass through, and attenuating reception signals in other communication bands not overlapping communication band B. Specifically, the filter 62B has an input terminal and an output terminal. The input terminal of the filter 62B is connected to the antenna connection terminal 101 or 102 with the switch 53 interposed therebetween, and the output terminal of the filter 62B is connected to the low-noise amplifier 24.

The filter 63 (B-TRx) is an example of a third filter, and has a passband including communication band B. Accordingly, the filter 63 is capable of allowing transmission signals and reception signals in communication band B to pass through, and attenuating transmission signals and reception signals in other communication bands not overlapping communication band B. Specifically, the filter 63 has two input/output terminals. One of the two input/output terminals of the filter 63 is connected to the antenna connection terminal 101 or 102 with the switch 53 interposed therebetween, and the other one of the two input/output terminals of the filter 63 is connected to the power amplifier 12 or the low-noise amplifier 23 with the switch 52 interposed therebetween.

The filters 62A and 62B constitute a multiplexer 62 and are formed as one chip. In short, the filters 62A and 62B are bundled together and connected to one terminal of the switch 53.

The switch 51 is an example of a first switch, and is connected between the filter 61 and the power amplifier 11/the low-noise amplifier 21. Specifically, the switch 51 has terminals 511 to 513. The terminal 511 is connected to the filter 61. The terminals 512 and 513 are connected to the power amplifier 11 and the low-noise amplifier 21, respectively.

With this connection configuration, the switch 51 is capable of, for example, connecting the terminal 511 to either of the terminals 512 and 513 on the basis of a control signal from the RFIC 3. In short, the switch 51 is capable of switching between the connection of the filter 61 and the power amplifier 11 and the connection of the filter 61 and the low-noise amplifier 21. The switch 51 is constituted of, for example, a Single Pole Double Throw (SPDT) switch circuit, and may sometimes be called a TDD switch.

The switch 52 is an example of a second switch, and is connected between the filter 63 and the power amplifier 12/the low-noise amplifier 23. Specifically, the switch 52 has terminals 521 to 523. The terminal 521 is connected to the filter 63. The terminals 522 and 523 are connected to the power amplifier 12 and the low-noise amplifier 23, respectively.

With this connection configuration, the switch 52 is capable of, for example, connecting the terminal 521 to either of the terminals 522 and 523 on the basis of a control signal from the RFIC 3. In short, the switch 52 is capable of switching between the connection of the filter 63 and the power amplifier 12 and the connection of the filter 63 and the low-noise amplifier 23. The switch 52 is constituted of, for example, an SPDT switch circuit, and may sometimes be called a TDD switch.

The switch 53 is an example of a third switch, and is connected between the antenna connection terminals 101 and 102, and the filters 61, 62A, 62B, and 63. Specifically, the switch 53 has terminals 531 to 535. The terminals 531 and 532 are connected to the antenna connection terminals 101 and 102, respectively. The terminal 533 is connected to the filter 61. The terminal 534 is connected to the multiplexer 62 (that is, the filters 62A and 62B). The terminal 535 is connected to the filter 63.

With this connection configuration, the switch 53 is capable of, for example, connecting the terminals 531 and 532 to two different terminals, respectively, among the terminals 533 to 535 on the basis of control signals from the RFIC 3. In short, the switch 53 is capable of switching between the connection and the non-connection of the antennas 2A and 2B and the filter 61/the multiplexer 62/the filter 63. The switch 53 is constituted of, for example, a multi-connection switch circuit, and may sometimes be called an antenna switch.

The control circuit 81 receives a digital control signal for Mobile Industry Processor Interface (MIPI), General Purpose I/O (GPIO), or the like from the RFIC 3, and controls at least one of the power amplifiers 11 and 12, the low-noise amplifiers 21 to 24, and the switches 51 to 53.

The power supply circuit 82 supplies power to at least one of the power amplifiers 11 and 12, the low-noise amplifiers 21 to 24, and the switches 51 to 53.

Note that some of the circuit elements illustrated in FIG. 1 may not be included in the RF module 1. For example, the RF module 1 only needs to include at least the power amplifier 11, the low-noise amplifier 21, the switch 51, and the filters 61 and 62A, and need not include the other circuit elements.

1.2 Component Arrangement of RF Module 1

Next, the component arrangement of the RF module 1 configured as above will be specifically described with reference to FIGS. 2A to 3.

Figure 2A:
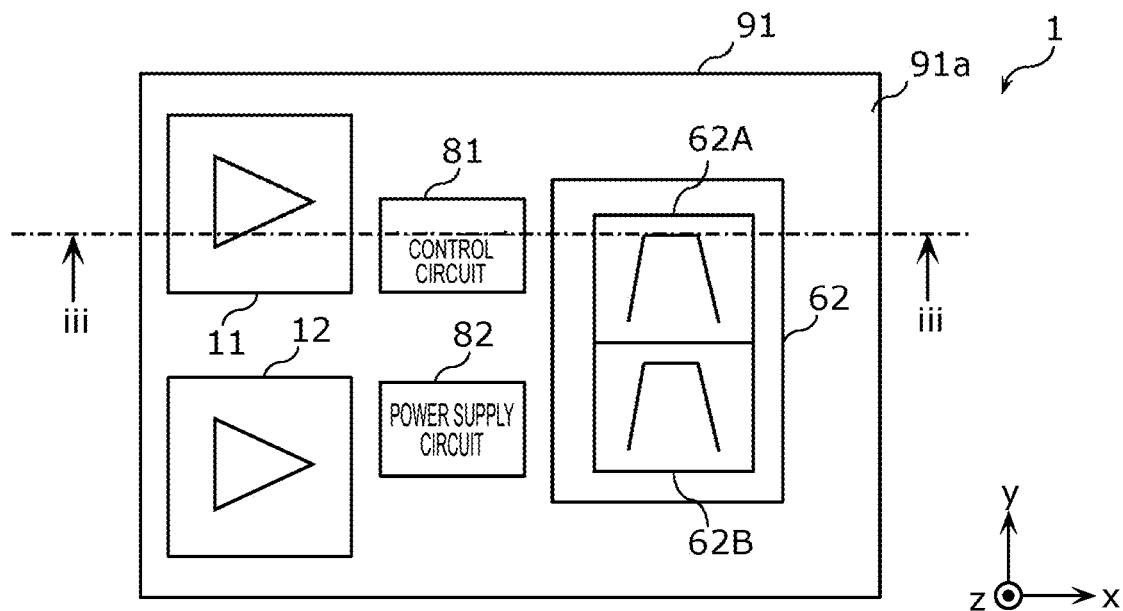
FIG. 2A is a plan view of the RF module according to the first embodiment.
Figure 2B:
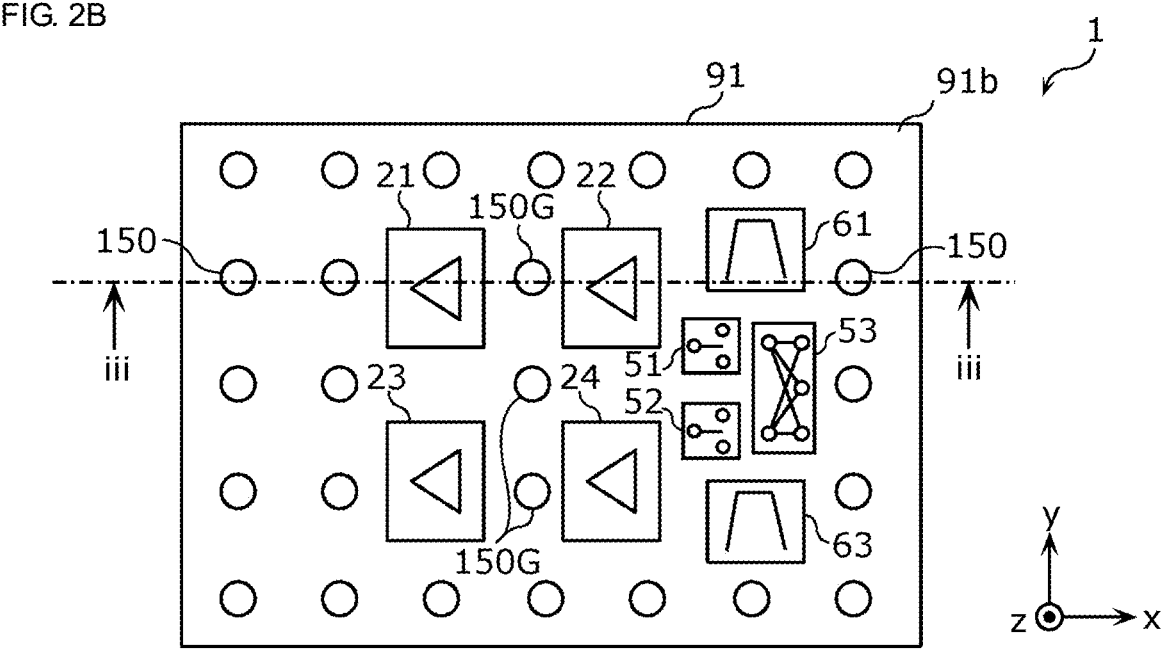
FIG. 2B is a plan view of the RF module according to the first embodiment.

FIG. 2A and FIG. 2B are plan views of the RF module 1 according to the first embodiment. Specifically, FIG. 2A illustrates a view of a main surface 91a of a module substrate 91 seen from the positive side of the z-axis. In addition, FIG. 2B illustrates a view of a main surface 91b of the module substrate 91 seen from the positive side of the z-axis. FIG. 3 is a sectional view of the RF module 1 according to the first embodiment. The cross-section of the RF module 1 in FIG. 3 is a cross-section taken along line iii-iii in FIGS. 2A and 2B. Note that the wiring and conductors on the module substrate 91 and in the module substrate 91 are only partly illustrated in FIGS. 2A to 3.

Figure 3:
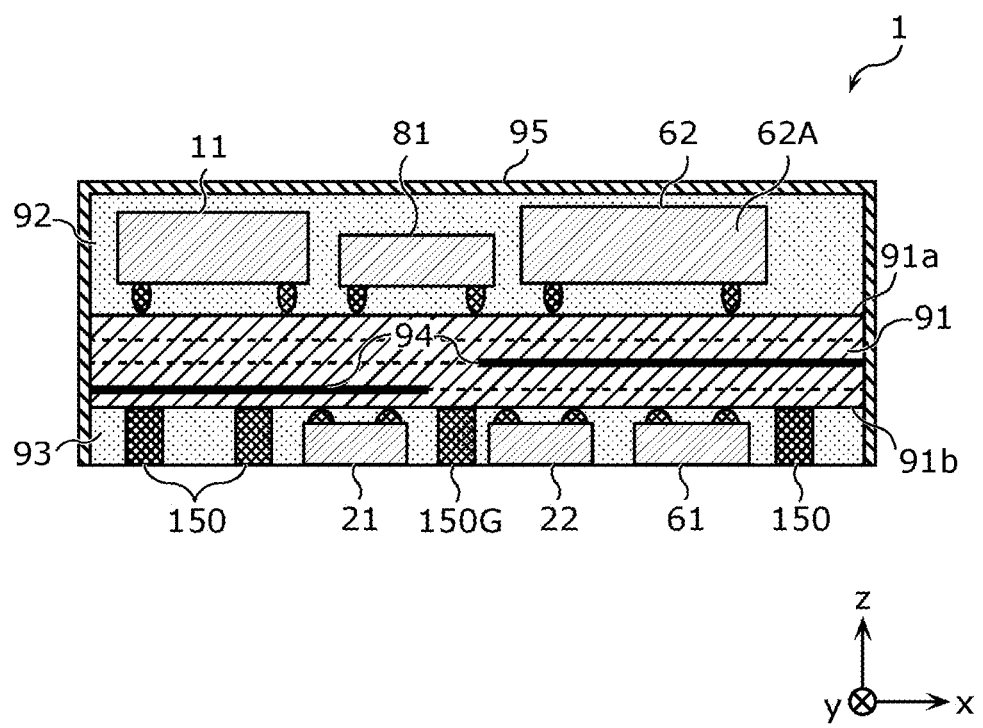
FIG. 3 is a sectional view of the RF module according to the first embodiment.

As illustrated in FIGS. 2A to 3, the RF module 1 further includes, in addition to circuit components constituting a circuit illustrated in FIG. 1, the module substrate 91, resin members 92 and 93, a shield electrode layer 95, and a plurality of post electrodes 150. Note that the illustrations of the resin members 92 and 93 and the shield electrode layer 95 are omitted in FIGS. 2A and 2B.

The module substrate 91 has the main surface 91a and the main surface 91b facing each other. As the module substrate 91, for example, a low-temperature co-fired ceramics (LTCC) substrate, a high-temperature co-fired ceramics (HTCC) substrate, a substrate including built-in components, a substrate with a redistribution layer (RDL), or a printed substrate, all of which have a multilayer structure including a plurality of dielectric layers, may be used, but these are not the only possible substrates serving as the module substrate 91. In the module substrate 91, a ground electrode pattern 94 is formed.

The main surface 91a is an example of a first main surface, and may sometimes be called a top surface or a front surface. As illustrated in FIGS. 2A and 3, the power amplifiers 11 and 12, the multiplexer 62, the control circuit 81, the power supply circuit 82, and the resin member 92 are arranged on the main surface 91a.

As the multiplexer 62 (that is, the filters 62A and 62B), for example, a surface acoustic wave (SAW) filter is used. Note that the multiplexer 62 is not limited to a SAW filter. For example, an elastic wave filter using a bulk acoustic wave (BAW), an LC filter, a dielectric filter, and a distributed constant filter may be used as the multiplexer 62, and furthermore, these are not the only possible filters serving as the multiplexer 62.

The resin member 92 covers circuit components on the main surface 91a. The resin member 92 functions to secure the reliability such as the mechanical strength and the moisture resistance of components on the main surface 91a.

The main surface 91b is an example of a second main surface, and may sometimes be called a bottom surface or a back surface. As illustrated in FIGS. 2B and 3, the low-noise amplifiers 21 to 24, the switches 51 to 53, the filters 61 and 63, the resin member 93, and the plurality of post electrodes 150 are arranged on the main surface 91b.

As the filters 61 and 63, for example, LC filters are used. An LC filter is constituted of, for example, a surface-mounted device (SMD) or an integrated passive device (IPD). Note that the filters 61 and 63 are not limited to LC filters. For example, SAW filters, elastic wave filters using BAW, dielectric filters, and distributed constant filters may be used as the filters 61 and 63, and furthermore, these are not the only possible filters serving as the filters 61 and 63.

The resin member 93 covers circuit components on the main surface 91b. The resin member 93 functions to secure the reliability such as the mechanical strength and the moisture resistance of components on the main surface 91b.

The shield electrode layer 95 is a metal thin film formed by sputtering, for example, and is formed to cover the top and side surfaces of the resin member 92 and the side surfaces of the module substrate 91 and the resin member 93. The shield electrode layer 95 is set to a ground potential, and suppresses external noise from entering the circuit components constituting the RF module 1.

The plurality of post electrodes 150 constitute a plurality of external connection terminals including the antenna connection terminals 101 and 102, the RF input terminals 111 and 112, and the RF output terminals 121 to 124, which are illustrated in FIG. 1, and a ground terminal (not illustrated). Each of the post electrodes 150 is arranged on the main surface 91b of the module substrate 91, and extends vertically from the main surface 91b. In addition, each of the post electrodes 150 penetrates the resin member 93, and one end thereof is exposed from the resin member 93. One end of each of the post electrodes 150 exposed from the resin member 93 is connected to an input/output terminal and/or a ground electrode on a mother board arranged in the negative direction of the z-axis of the RF module 1.

The plurality of post electrodes 150 include post electrodes 150G set to the ground potential. Here, at least one of the post electrodes 150G is an example of a first conductive member, and is arranged between the low-noise amplifiers 21 and 22. At least another one of the post electrodes 150G is an example of a second conductive member, and is arranged between the low-noise amplifiers 23 and 24.

A footprint of the filter 62A overlaps a footprint of the low-noise amplifier 22 in a plan view of the module substrate 91. Accordingly, the filter 62A and the low-noise amplifier 22 may be connected to each other with, for example, a via conductor in the module substrate 91 interposed therebetween, and the wiring length between the low-noise amplifier 22 and the filter 62A may be made shorter.

In addition, a footprint of filter 62B overlaps a footprint of low-noise amplifier 24 in a plan view of the module substrate 91. Accordingly, the filter 62B and the low-noise amplifier 24 may be connected to each other with, for example, a via conductor in the module substrate 91 interposed therebetween, and the wiring length between the low-noise amplifier 24 and the filter 62B may be made shorter.

Furthermore, the footprints of each of the filters 62A and 62B overlap a footprint of switch 53 in a plan view of the module substrate 91. Accordingly, the filters 62A and 62B and the switch 53 may be connected to each other with, for example, a via conductor in the module substrate 91 interposed therebetween, and the wiring length between the filters 62A and 62B and the switch 53 may be made shorter.

Note that, in a plan view of the module substrate 91, the footprint of filter 62A need not overlap the footprint of low-noise amplifier 22, and the footprint of filter 62B need not overlap the footprint of low-noise amplifier 24. Furthermore, in a plan view of the module substrate 91, footprints of each of the filters 62A and 62B need not overlap the footprint of switch 53.

Note that the component arrangement in FIGS. 2A to 3 is only one example, and this is not the only possible component arrangement. For example, the filter 61 may be arranged on the main surface 91a, and the filter 62A may be arranged on the main surface 91b. In addition, for example, the filters 61 and 62A may be arranged on the same main surface (main surface 91a or 91b) of the module substrate 91. Furthermore, the arrangement of the filters 63 and 62B is not limited to the arrangement in FIGS. 2A to 3, like the arrangement of the filters 61 and 62A.

1.3 Flow of Signals

Figure 4:
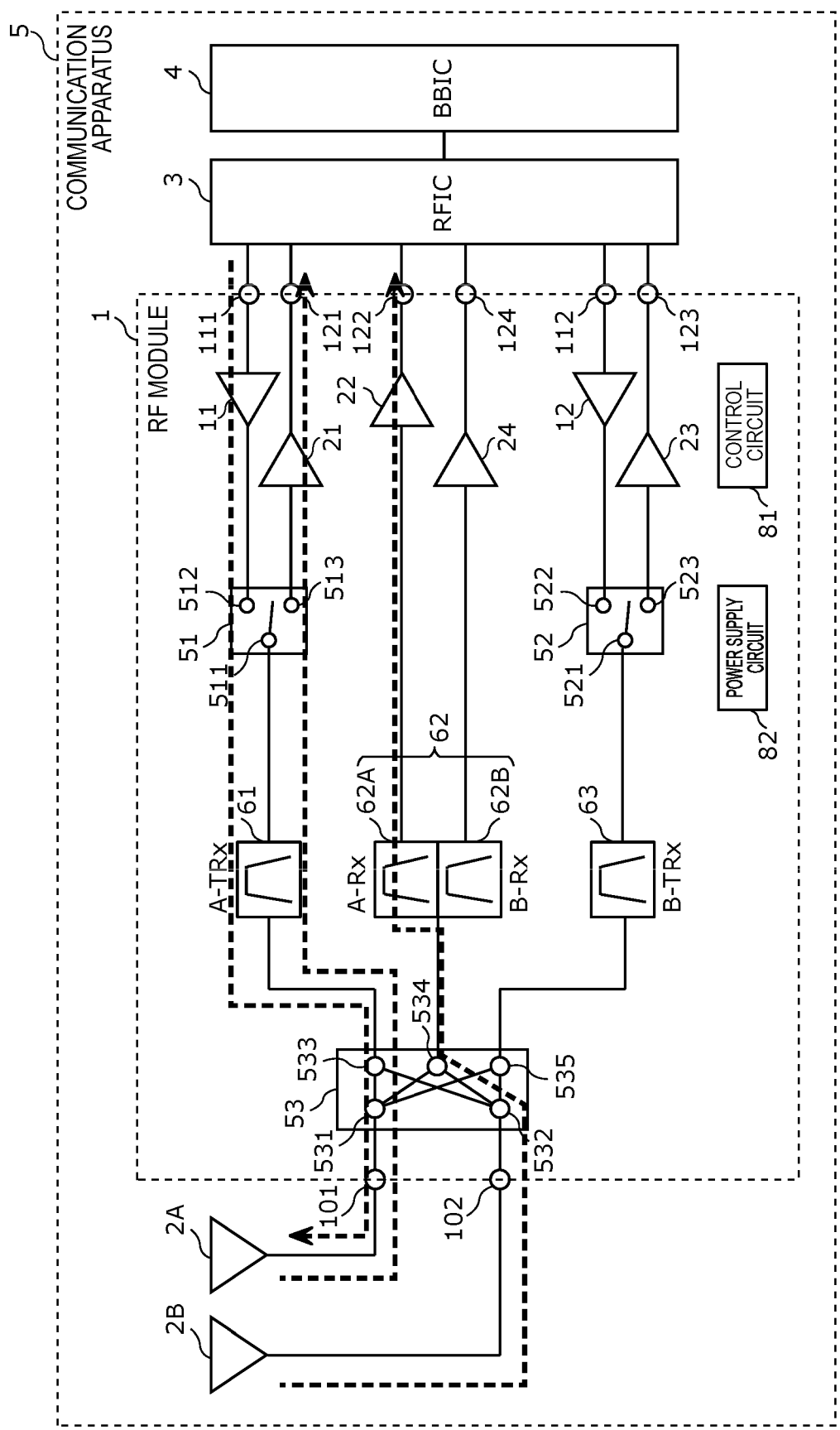
FIG. 4 is a diagram illustrating the flow of signals in communication band A in the RF module according to the first embodiment.
Figure 5:
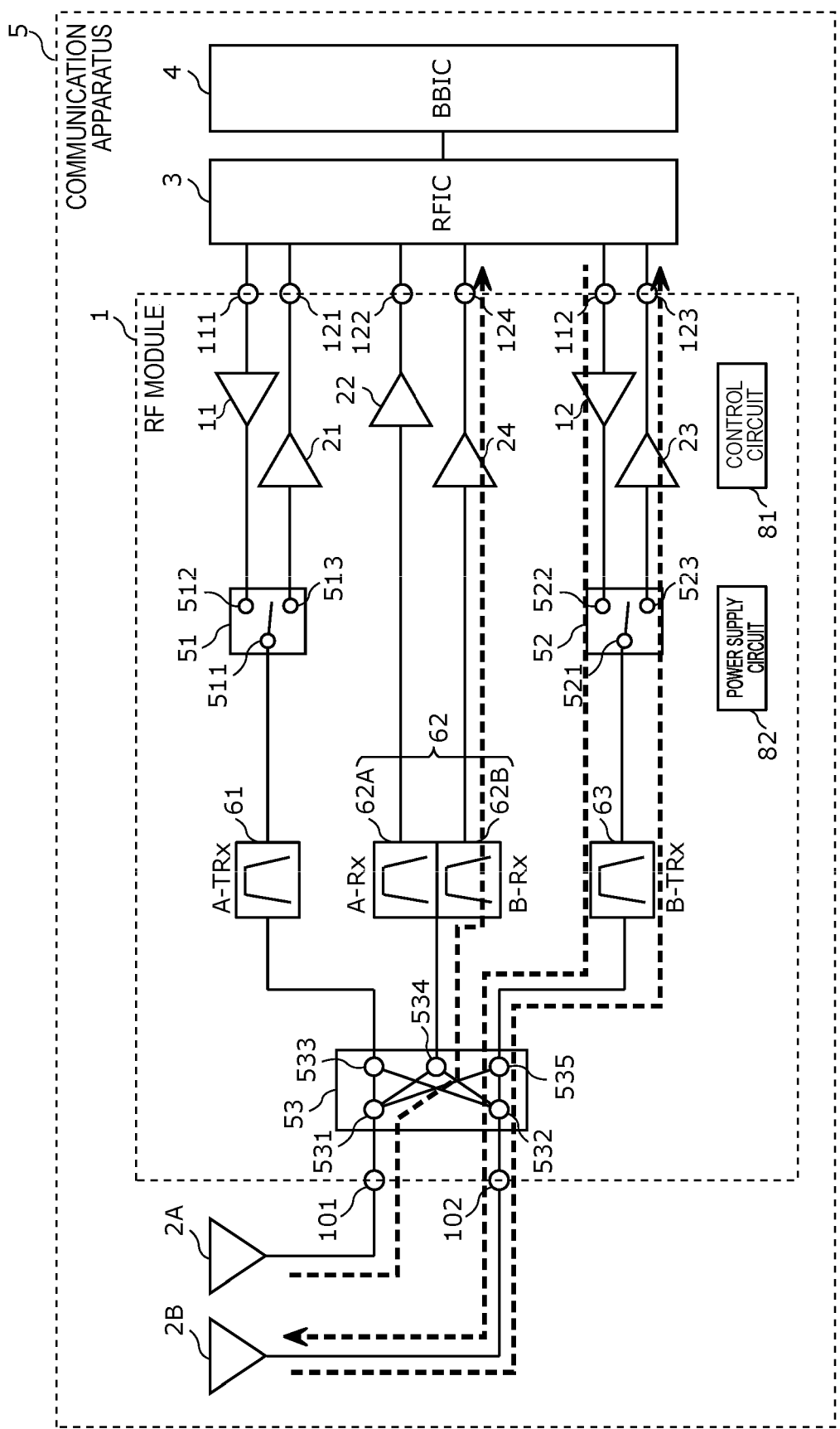
FIG. 5 is a diagram illustrating the flow of signals in communication band B in the RF module according to the first embodiment.

Next, the flow of signals in the RF module 1 configured as above will be described with reference to FIGS. 4 and 5. FIG. 4 is a circuit diagram illustrating the flow of signals in communication band A in the RF module 1 according to the first embodiment. FIG. 5 is a circuit diagram illustrating the flow of signals in communication band B in the RF module 1 according to the first embodiment. In FIGS. 4 and 5, the flow of signals is represented by a broken arrow.

In FIG. 4, one uplink and two downlinks in communication band A are realized. Specifically, a transmission signal in communication band A is transmitted from the RFIC 3 to the antenna 2A by way of the RF input terminal 111, the power amplifier 11, the switch 51, the filter 61, the switch 53, and the antenna connection terminal 101. In addition, a reception signal in communication band A is transmitted from the antenna 2A to the RFIC 3 by way of the antenna connection terminal 101, the switch 53, the filter 61, the switch 51, the low-noise amplifier 21, and the RF output terminal 121. At this time, transmission of a transmission signal and a reception signal in communication band A is exclusively switched by the switch 51. Furthermore, a reception signal in communication band A is transmitted from the antenna 2B to the RFIC 3 by way of the antenna connection terminal 102, the switch 53, the filter 62A, the low-noise amplifier 22, and the RF output terminal 122.

In FIG. 5, one uplink and two downlinks in communication band B are realized. Specifically, a transmission signal in communication band B is transmitted from the RFIC 3 to the antenna 2B by way of the RF input terminal 112, the power amplifier 12, the switch 52, the filter 63, the switch 53, and the antenna connection terminal 102. In addition, a reception signal in communication band B is transmitted from the antenna 2B to the RFIC 3 by way of the antenna connection terminal 102, the switch 53, the filter 63, the switch 52, the low-noise amplifier 23, and the RF output terminal 123. At this time, transmission of a transmission signal and a reception signal in communication band B is exclusively switched by the switch 52. Furthermore, a reception signal in communication band B is transmitted from the antenna 2A to the RFIC 3 by way of the antenna connection terminal 101, the switch 53, the filter 62B, the low-noise amplifier 24, and the RF output terminal 124.

1.4 Advantageous Effects

As described above, the RF module substrate 1 according to the present embodiment includes: the module substrate 91 with the main surface 91a and the main surface 91b on opposite sides of the module substrate; the filter 61 with a passband including communication band A for TDD; the switch 51 connected to the filter 61; the power amplifier 11, which is arranged on the main surface 91a and which is connected to the filter 61 with the switch 51 interposed therebetween; the low-noise amplifier 21, which is arranged on the main surface 91b and which is connected to the filter 61 with the switch 51 interposed therebetween; the filter 62A with a passband including communication band A; the low-noise amplifier 22, which is arranged on the main surface 91b and which is connected to the filter 62A; the plurality of post electrodes 150 arranged on the main surface 91b; and the first conductive member arranged between the low-noise amplifiers 21 and 22 on the main surface 91b.

Accordingly, the first conductive member may be arranged between the two low-noise amplifiers 21 and 22. Therefore, it may be possible to suppress the magnetic field coupling, the electric field coupling, or the electro-magnetic field coupling of the two low-noise amplifiers 21 and 22, which respectively amplify two reception signals in communication band A, and to improve the isolation between the two low-noise amplifiers 21 and 22. As a result, the RF module 1 may be able to, in simultaneous reception of two reception signals in communication band A, suppress the interference between the two reception signals and improve the reception sensitivity. With the use of a filter or the like, it is difficult to remove only one of two reception signals simultaneously received in the same communication band for TDD. It is thus effective, in terms of improving the reception sensitivity, to arrange the first conductive member between these two low-noise amplifiers 21 and 22.

In addition, for example, in the RF module 1 according to the present embodiment, the filter 61 may be arranged on one of the main surfaces 91a and 91b, and the filter 62A may be arranged on the other one of the main surfaces 91a and 91b.

Accordingly, the two filters 61 and 62A are arranged on the opposite sides of the module substrate 91. Therefore, it may be possible to suppress the magnetic field coupling, the electric field coupling, or the electro-magnetic field coupling of the two filters 61 and 62A, which respectively transmit two reception signals in communication band A, and to improve the isolation between the two filters 61 and 62A. As a result, the RF module 1 may be able to, in simultaneous reception of two reception signals in communication band A, suppress the interference between the two reception signals and improve the reception sensitivity.

In addition, for example, in the RF module 1 according to the present embodiment, the filter 62A is arranged on the main surface 91a, and the footprint of filter 62A may overlap the footprint of low-noise amplifier 22 in a plan view of the module substrate 91.

Accordingly, the filter 62A and the low-noise amplifier 22 may be arranged overlappingly with the module substrate 91 interposed therebetween. Therefore, the wiring length between the filter 62A and the low-noise amplifier 22 may be made shorter, and a wiring loss and a mismatching loss, which is due to variations in wiring, may be reduced. As a result, the RF module 1 may further improve the reception sensitivity in communication band A.

In addition, for example, in the RF module 1 according to the present embodiment, the filter 61 may be constituted of an LC filter.

Accordingly, the RF module 1 may use an LC filter as the filter 61 for both transmission and reception in communication band A.

In addition, for example, in the RF module 1 according to the present embodiment, the filter 62A may be constituted of a SAW filter.

Accordingly, the RF module 1 may use a SAW filter as the filter 62A for reception in communication band A.

In addition, for example, the RF module 1 according to the present embodiment may further include: the filter 63 with a passband including communication band B for TDD, communication band B being different from communication band A; the switch 52 connected to the filter 63; the power amplifier 12, which is arranged on the main surface 91a and which is connected to the filter 63 with the switch 52 interposed therebetween; the low-noise amplifier 23, which is arranged on the main surface 91b and which is connected to the filter 63 with the switch 52 interposed therebetween; the filter 62B with a passband including communication band B; the low-noise amplifier 24, which is arranged on the main surface 91b and which is connected to the filter 62B; the switch 53 connected to the antenna connection terminals 101 an 102; and the second conductive member arranged between the low-noise amplifiers 23 and 24 on the main surface 91b. The filters 61, 62A, 62B, and 63 may be connected to the antenna connection terminals 101 and 102 with the switch 53 interposed therebetween.

Accordingly, the second conductive member may be arranged between the two low-noise amplifiers 23 and 24. Therefore, it may be possible to suppress the magnetic field coupling, the electric field coupling, or the electro-magnetic field coupling of the two low-noise amplifiers 23 and 24, which respectively amplify two reception signals in communication band B, and to improve the isolation between the two low-noise amplifiers 23 and 24. As a result, the RF module 1 may be able to, in simultaneous reception of two reception signals in communication band B, as in communication band A, suppress the interference between the two reception signals and improve the reception sensitivity.

In addition, in the RF module 1 according to the present embodiment, the filters 62A and 62B may be formed as one chip as the multiplexer 62, and the switch 53 may have the terminals 531 and 532 connected to the antenna connection terminal 101 and 102, respectively, the terminals 533 and 535 connected to the filters 61 and 63, respectively, and the terminal 534 connected to the multiplexer 62.

Accordingly, the filters 62A and 62B may be formed as one chip as the multiplexer 62. Therefore, the number of components may be made fewer than that in the case where the filters 62A and 62B are individually mounted. Furthermore, by connecting the multiplexer 62 to the terminal 534 of the switch 53, the filters 62A and 62B may be connected using one terminal 534, thereby reducing the number of terminals of the switch 53. As a result, the bandpass characteristics of the switch 53 may be improved, and the reception sensitivity of the RF module 1 may be improved.

In addition, for example, in the RF module 1 according to the present embodiment, the multiplexer 62 may be constituted of a SAW filter.

Accordingly, the RF module 1 may use a SAW filter as the multiplexer 62 for reception in communication bands A and B.

In addition, for example, in the RF module 1 according to the present embodiment, the filter 63 may be constituted of an LC filter.

Accordingly, an LC filter may be used as the filter 63 for both transmission and reception in communication band B.

In addition, for example, in the RF module 1 according to the present embodiment, the filter 63 may be arranged on one of the main surfaces 91a and 91b, and the filter 62B may be arranged on the other one of the main surfaces 91a and 91b.

Accordingly, the two filters 62B and 63 are arranged on the opposite sides of the module substrate 91. Therefore, it may be possible to suppress the magnetic field coupling, the electric field coupling, or the electro-magnetic field coupling of the two filters 62B and 63, which respectively transmit two reception signals in communication band B, and to improve the isolation between the two filters 62B and 63. As a result, the RF module 1 may be able to, in simultaneous reception of two reception signals in communication band B, suppress the interference between the two reception signals and improve the reception sensitivity.

In addition, for example, in the RF module 1 according to the present embodiment, the filter 62B is arranged on the main surface 91a, and a footprint of the filter 62B may overlap the footprint of low-noise amplifier 24 in a plan view of the module substrate 91.

Accordingly, the filter 62B and the low-noise amplifier 24 may be arranged overlappingly with the module substrate 91 interposed therebetween. Therefore, the wiring length between the filter 62B and the low-noise amplifier 24 may be made shorter, and a wiring loss and a mismatching loss, which is due to variations in wiring, may be reduced. As a result, the RF module 1 may further improve the reception sensitivity in communication band B.

In addition, for example, in the RF module 1 according to the present embodiment, the filter 62A is arranged on the main surface 91a, and the footprint of filter 62A may overlap the footprint of switch 53 in a plan view of the module substrate 91.

Accordingly, the filter 62A and the switch 53 may be arranged overlappingly with the module substrate 91 interposed therebetween. Therefore, the wiring length between the filter 62A and the switch 53 may be made shorter, and a wiring loss and a mismatching loss, which is due to variations in wiring, may be reduced. As a result, the RF module 1 may further improve the reception sensitivity in communication band A.

In addition, for example, in the RF module 1 according to the present embodiment, the filter 62B is arranged on the main surface 91a, and the footprint of filter 62B may overlap the footprint of switch 53 in a plan view of the module substrate 91.

Accordingly, the filter 62B and the switch 53 may be arranged overlappingly with the module substrate 91 interposed therebetween. Therefore, the wiring length between the filter 62B and the switch 53 may be made shorter, and a wiring loss and a mismatching loss, which is due to variations in wiring, may be reduced. As a result, the RF module 1 may further improve the reception sensitivity in communication band B.

In addition, for example, in the RF module 1 according to the present embodiment, communication band A is band n77 for 5GNR, and communication band B is band n79 for 5GNR.

Accordingly, the RF module 1 may handle one uplink and two downlinks of each of bands n77 and n79 for 5GNR.

In addition, the communication apparatus 5 according to the present embodiment includes the RFIC 3, which processes an RF signal, and the RF module 1, which transmits the RF signal between the RFIC 3 and the antennas 2A and 2B.

Accordingly, the communication apparatus 5 may achieve advantageous effects that are the same as or similar to the above-mentioned advantageous effects of the RF module 1.

Although the post electrodes 150G are used as the first conductive member and the second conductive member in the present embodiment, these are not the only possible conductive members serving as the first conductive member and the second conductive member. For example, instead of the post electrodes 150G or in addition to the post electrodes 150G, a metal wall arranged on the main surface 91b of the module substrate 91 may be used as the first conductive member and/or the second conductive member.

In addition, the first conductive member and the second conductive member are not limited to ground conductors set to the ground potential (such as the post electrodes 150G). For example, instead of the ground conductors or in addition to the ground conductors, at least one of the other post electrodes 150 functioning as input/output terminals, the control circuit 81, and the power supply circuit 82 may be used as the first conductive member and/or the second conductive member. Even in such a case, it may be possible to suppress the magnetic field coupling, the electric field coupling, or the electro-magnetic field coupling of the two low-noise amplifiers 21 and 22, and to suppress the magnetic field coupling, the electric field coupling, or the electro-magnetic field coupling of the two low-noise amplifiers 23 and 24. Therefore, the isolation between the two low-noise amplifiers 21 and 22 and the isolation between the two low-noise amplifiers 23 and 24 may be improved.

Although the low-noise amplifiers 21 to 24, the switches 51 to 53, the control circuit 81, and the power supply circuit 82 are configured as individual components in the present embodiment, these are not the only possible configurations of these components. Some or all of the low-noise amplifiers 21 to 24, the switches 51 to 53, the control circuit 81, and the power supply circuit 82 may be included in one or more semiconductor integrated circuits. A semiconductor integrated circuit is an electronic circuit formed on the surface and in the interior of a semiconductor chip (also called a die), and is also called a semiconductor component. A semiconductor integrated circuit may include, for example, complementary metal oxide semiconductor (CMOS), and specifically may be configured by a silicon on insulator (SOI) process. Accordingly, a semiconductor integrated circuit may be manufactured at a low cost. Note that a semiconductor integrated circuit may include at least one of gallium arsenide (GaAs), silicon germanium (SiGe), and gallium nitride (GaN). Accordingly, a high-quality semiconductor integrated circuit may be realized.

In the case where one semiconductor integrated circuit includes the low-noise amplifiers 21 and 22, at least one of a ground conductor, the control circuit 81, and the power supply circuit 82 may be arranged between the low-noise amplifiers 21 and 22 in the semiconductor integrated circuit. Similarly, in the case where one semiconductor integrated circuit includes the low-noise amplifiers 23 and 24, at least one of a ground conductor, the control circuit 81, and the power supply circuit 82 may be arranged between the low-noise amplifiers 23 and 24 in the semiconductor integrated circuit.

Although the filters 62A and 62B constitute the multiplexer 62 and are formed as one chip in the present embodiment, this is not the only possible configuration of the filters 62A and 62B. For example, the filters 62A and 62B may be separate filter components connected to different terminals of the switch 53.

Although the communication apparatus 5 and the RF module 1 handle two communication bands for TDD in the present embodiment, the communication apparatus 5 and the RF module 1 may handle only one communication band for TDD. In this case, the communication apparatus 5 and the RF module 1 may include components used in only one and both of communication bands A and B, and need not include components used only in the other one of communication bands A and B.

Second Embodiment

Next, a second embodiment will be described. In the present embodiment, the point that an RF module includes a configuration for realizing four downlinks is mainly different from the above-described first embodiment. An RF module according to the present embodiment will be described with reference to the drawings, focusing on the differences from the first embodiment.

2.1 Circuit Configuration of RF Module 1A and Communication Apparatus 5A

Figure 6:
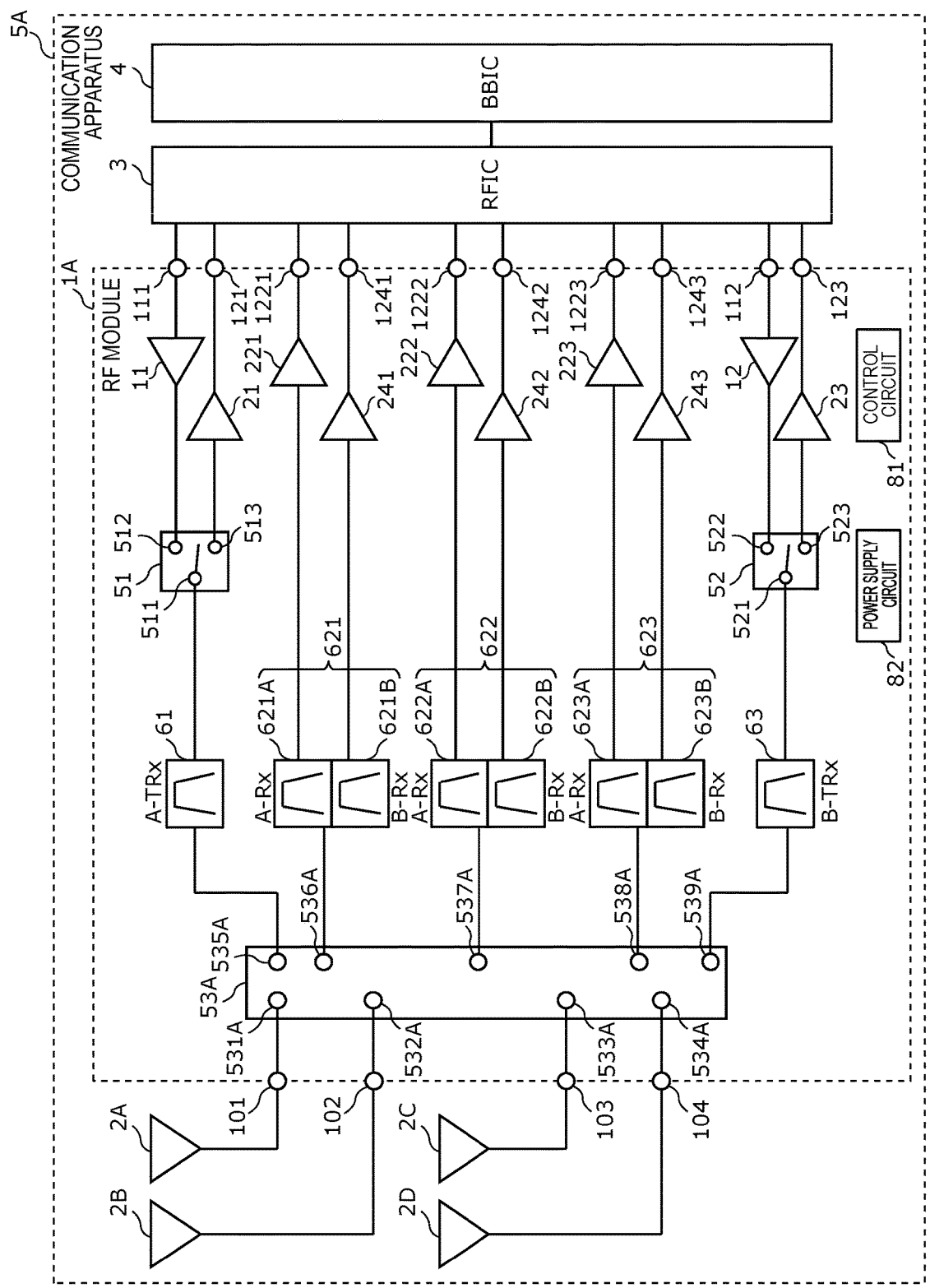
FIG. 6 is a circuit configuration diagram of an RF module and a communication apparatus according to a second embodiment.

The circuit configuration of an RF module 1A and a communication apparatus 5A according to the present embodiment will be described with reference to FIG. 6. FIG. 6 is a circuit configuration diagram of the RF module 1A and the communication apparatus 5A according to the second embodiment.

2.1.1 Circuit Configuration of Communication Apparatus 5A

At first, the circuit configuration of the communication apparatus 5A will be described. As illustrated in FIG. 6, the communication apparatus 5A according to the present embodiment includes the RF module 1A, antennas 2A to 2D, the RFIC 3, and the BBIC 4.

The RF module LA transmits RF signals between the antennas 2A to 2D and the RFIC 3. The detailed circuit configuration of the RF module 1A will be described later.

The antennas 2A to 2D are connected to antenna connection terminals 101 to 104, respectively, of the RF module 1A, transmit RF signals output from the RF module LA, and receive RF signals from the outside and output the received RF signals to the RF module 1A.

Note that the antennas 2A to 2D and the BBIC 4 are not essential elements of the communication apparatus 5A according to the present embodiment.

2.1.2 Circuit Configuration of RF Module 1A

Next, the circuit configuration of the RF module 1A will be described. As illustrated in FIG. 6, the RF module 1A includes the power amplifiers 11 and 12, low-noise amplifiers 21, 23, 221 to 223, and 241 to 243, switches 51, 52, and 53A, filters 61, 63, 621A to 623A, and 621B to 623B, the control circuit 81, the power supply circuit 82, the antenna connection terminals 101 to 104, the RF input terminals 111 and 112, and RF output terminals 121, 123, 1221 to 1223, and 1241 to 1243.

The antenna connection terminals 101 to 104 are connected to the antennas 2A to 2D, respectively.

The RF output terminals 1221 to 1223 and 1241 to 1243 are terminals for providing RF reception signals to outside the RF module 1A. Specifically, the RF output terminals 1221 to 1223 are terminals for supplying reception signals in communication band A to the RFIC 3. In addition, the RF output terminals 1241 and 1243 are terminals for supplying reception signals in communication band B to the RFIC 3.

Each of the low-noise amplifiers 221 to 223 is an example of a second low-noise amplifier. The low-noise amplifiers 221 to 223 are connected to the filters 621A to 623A, respectively. The low-noise amplifiers 221 to 223 are capable of amplifying reception signals in communication band A, which are input from the antenna connection terminals 101 to 104 via the switch 53A and the filter 621A to 623A. The amplified reception signals in communication band A, which are amplified by the low-noise amplifier 221 to 223, are output to the RF output terminal 1221 to 1223, respectively.

Each of the low-noise amplifiers 241 to 243 is an example of a fourth low-noise amplifier. The low-noise amplifiers 241 to 243 are connected to the filters 621B to 623B, respectively. The low-noise amplifiers 241 to 243 are capable of amplifying reception signals in communication band B, which are input from the antenna connection terminals 101 to 104 via the switch 53A and the filter 621B to 623B. The amplified reception signals in communication band B, which are amplified by the low-noise amplifier 241 to 243, are output to the RF output terminal 1241 to 1243, respectively.

Each of the filters 621A to 623A (A-Rx) is an example of a second filter, and has a passband including communication band A. Accordingly, each of the filters 621A to 623A is capable of allowing reception signals in communication band A to pass through, and attenuating reception signals in other communication bands not overlapping communication band A.

Specifically, each of the filters 621A to 623A has an input terminal and an output terminal. The input terminal of each of the filters 621A to 623A is connected to any of the antenna connection terminals 101 to 104 with the switch 53A interposed therebetween, and the output terminal of each of the filters 621A to 623A is connected to a corresponding one of the low-noise amplifiers 221 to 223.

Each of the filters 621B to 623B (B-Rx) is an example of a fourth filter, and has a passband including communication band B. Accordingly, each of the filters 621B to 623B is capable of allowing reception signals in communication band B to pass through, and attenuating reception signals in other communication bands not overlapping communication band B.

Specifically, each of the filters 621B to 623B has an input terminal and an output terminal. The input terminal of each of the filters 621B to 623B is connected to any of the antenna connection terminals 101 to 104 with the switch 53A interposed therebetween, and the output terminal of each of the filters 621B to 623B is connected to a corresponding one of the low-noise amplifiers 241 to 243.

The filters 621A and 621B constitute a multiplexer 621 and are formed as one chip. In short, the filters 621A and 621B are bundled together and connected to one terminal of the switch 53A.

The filters 622A and 622B constitute a multiplexer 622 and are formed as one chip. In short, the filters 622A and 622B are bundled together and connected to one terminal of the switch 53A.

The filters 623A and 623B constitute a multiplexer 623 and are formed as one chip. In short, the filters 623A and 623B are bundled together and connected to one terminal of the switch 53A.

The switch 53A is an example of a third switch, and is connected between the antenna connection terminals 101 to 104, and the filters 61, 63, 621A to 623A, and 621B to 623B. Specifically, the switch 53A has terminals 531A to 539A. The terminals 531A to 534A are connected to the antenna connection terminals 101 to 104, respectively. The terminal 535A is connected to the filter 61. The terminal 536A is connected to the multiplexer 621 (that is, the filters 621A and 621B). The terminal 537A is connected to the multiplexer 622 (that is, the filters 622A and 622B). The terminal 538A is connected to the multiplexer 623 (that is, the filters 623A and 623B). The terminal 539A is connected to the filter 63.

With this connection configuration, the switch 53A is capable of, for example, connecting the terminals 531A to 534A to different terminals 535A to 539A on the basis of control signals from the RFIC 3. In short, the switch 53A is capable of switching between the connection and the non-connection of the antennas 2A to 2D and the filter 61/the multiplexers 621 to 623/the filter 63. The switch 53A is constituted of, for example, a multi-connection switch circuit, and may sometimes be called an antenna switch.

2.2 Component Arrangement of RF Module 1A

Because various components included in the RF module 1A may be arranged in a manner that is the same as or similar to that of the first embodiment, illustrations of these components are omitted, and descriptions thereof are simplified.

In the RF module LA, a first conductive member (such as the post electrode 150, the control circuit 81, or the power supply circuit 82) is arranged between any two of the low-noise amplifiers 21 and 221 to 223. Furthermore, a second conductive member (such as the post electrode 150, the control circuit 81, or the power supply circuit 82) is arranged between any two of the low-noise amplifiers 23 and 241 to 243.

2.2 Advantageous Effects

As described above, the RF module 1A according to the present embodiment includes: the module substrate 91 with the main surface 91a and the main surface 91b on opposite sides of the module substrate; the filter 61 with a passband including communication band A for TDD; the switch 51 connected to the filter 61; the power amplifier 11, which is arranged on the main surface 91a and which is connected to the filter 61 with the switch 51 interposed therebetween; the low-noise amplifier 21, which is arranged on the main surface 91b and which is connected to the filter 61 with the switch 51 interposed therebetween; the filters 621A to 623A each with a passband including communication band A; the low-noise amplifiers 221 to 223, which are arranged on the main surface 91b and which are connected to the filters 621A to 623A, respectively; and the first conductive member arranged between any two of the low-noise amplifiers 21 and 221 to 223 on the main surface 91b.

Accordingly, the RF module 1A may realize one uplink and four downlinks in communication band A with one module, thereby suppressing the interference between four reception signals in communication band A and improving the reception sensitivity.

In addition, the RF module 1A according to the present embodiment may further include: the filter 63 with a passband including communication band B for TDD, communication band B being different from communication band A; the switch 52 connected to the filter 63; the power amplifier 12, which is arranged on the main surface 91a and which is connected to the filter 63 with the switch 52 interposed therebetween; the low-noise amplifier 23, which is arranged on the main surface 91b and which is connected to the filter 63 with the switch 52 interposed therebetween; the filters 621B to 623B each with a passband including communication band B; the low-noise amplifiers 241 to 243, which are arranged on the main surface 91b and which are connected to the filters 621B to 623B, respectively; the switch 53A connected to the antenna connection terminals 101 to 104; and the second conductive member arranged between any two of the low-noise amplifiers 23 and 241 to 243. The filters 61, 63, 621A to 623A, and 621B to 623B may be connected to the antenna connection terminals 101 to 104 with the switch 53A interposed therebetween.

Accordingly, the RF module 1A may realize, in addition to one uplink and four downlinks in communication band A, one uplink and four downlinks in communication band B with one module, thereby suppressing the interference between four reception signals in communication band B and improving the reception sensitivity.

Third Embodiment

Next, a third embodiment will be described. An RF module according to the present embodiment is different from the above-described first embodiment in the point that the RF module includes bump electrodes instead of the post electrodes. The present embodiment will be described below with reference to the drawings, focusing on the differences from the first embodiment.

Since the circuit configuration of an RF module 1B according to the present embodiment is the same as or similar to that of the first embodiment, illustrations and descriptions thereof are omitted.

3.1 Component Arrangement of RF Module 1B

Figure 7:
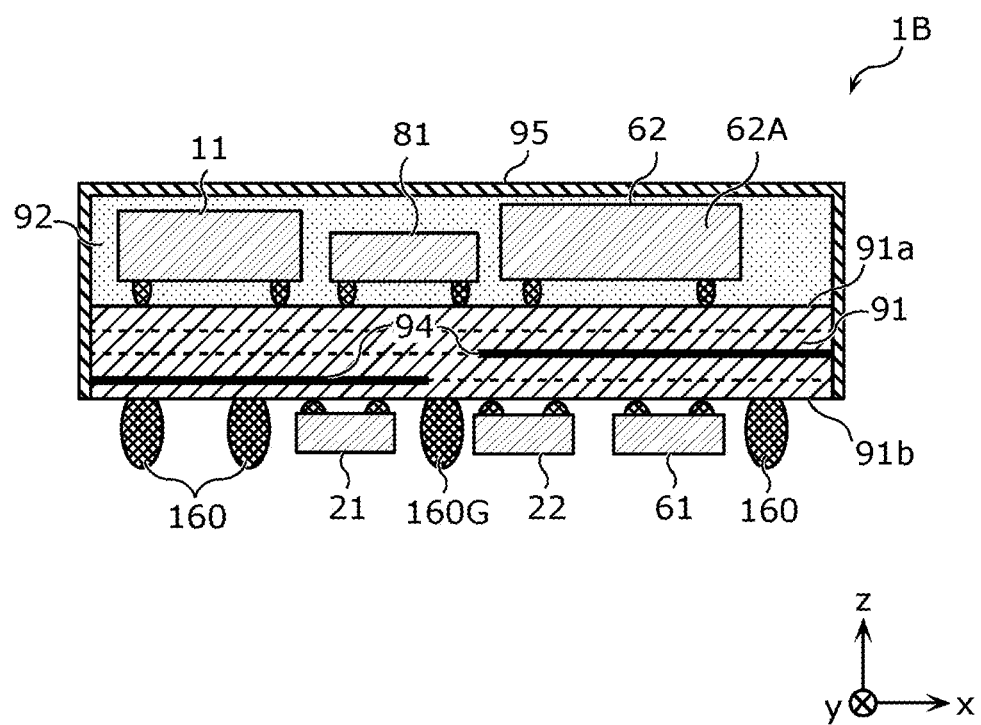
FIG. 7 is a sectional view of an RF module according to a third embodiment.

FIG. 7 is a sectional view of the RF module 1B according to the third embodiment. As illustrated in FIG. 7, the RF module 1B includes a plurality of bump electrodes 160, instead of the plurality of post electrodes 150. Here, bump electrodes 160G set to the ground potential are arranged between the low-noise amplifiers 21 and 22 and between the low-noise amplifiers 23 and 24. The RF module 1B need not include the resin member 93 covering the circuit components on the main surface 91b.

3.2 Advantageous Effects

As described above, the RF module 1B according to the present embodiment may include the plurality of bump electrodes 160 arranged on the main surface 91b as a plurality of external connection terminals.

OTHER EMBODIMENTS

Although the RF module and the communication apparatus according to embodiments of the present disclosure have been described as above on the basis of the embodiments, the RF module and the communication apparatus according to embodiments of the present disclosure are not limited to the above-described embodiments. Different embodiments realized by combining arbitrary elements in the above-described embodiments, modifications obtained by applying various changes conceived by those skilled in the art to the above-described embodiments without departing from the gist of the present disclosure, and various types of equipment including the RF module and the communication apparatus described above are also included in the present disclosure.

For example, in the circuit configuration of the RF module and the communication apparatus according to each of the above-described embodiments, another circuit element and wiring may be provided in a path connecting each circuit element and a signal path illustrated in the drawings. For example, a filter may be provided between each of the antenna connection terminals 101 and 102 and the switch 53 in the above-described first embodiment. In addition, for example, a matching circuit may be provided between the antenna connection terminals 101 and 102 and the filters 61 to 63, and/or between the filters 61 to 63, the power amplifiers 11 and 12, and the low-noise amplifiers 21 to 24.

INDUSTRIAL APPLICABILITY

The present disclosure is widely usable in communication equipment such as cellular phones as an RF module arranged in a front-end portion.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A radio frequency module comprising:
   a module substrate with a first main surface and a second main surface on opposite sides of the module substrate;
   a first filter with a passband including a first communication band for time division duplex (TDD);
   a first switch connected to the first filter;
   a first power amplifier arranged on the first main surface and connected to the first filter via the first switch;
   a first low-noise amplifier that is arranged on the second main surface and connected to the first filter via the first switch;
   a second filter with a passband including the first communication band;
   a second low-noise amplifier that is arranged on the second main surface and connected to the second filter; and
   a first conductive member arranged between the first low-noise amplifier and the second low-noise amplifier on the second main surface.

2. The radio frequency module of claim 1, further comprising:
   a plurality of external connection terminals arranged on the second main surface.

3. The radio frequency module of claim 1, wherein
   the first filter is arranged on one of the first main surface and the second main surface, and
   the second filter is arranged on the other one of the first main surface and the second main surface.

4. The radio frequency module of claim 1, wherein
   the second filter is arranged on the first main surface.

5. The radio frequency module of claim 4, wherein
   a footprint of the second filter overlaps a footprint of the second low-noise amplifier in a plan view of the module substrate.

6. The radio frequency module of claim 1, wherein
   the first filter is an LC filter.

7. The radio frequency module of claim 1, wherein
   the second filter is a surface acoustic wave (SAW) filter.

8. The radio frequency module of claim 1, further comprising:
   a third filter with a passband including a second communication band for TDD, the second communication band being different from the first communication band;
   a second switch connected to the third filter;
   a second power amplifier that is arranged on the first main surface and connected to the third filter via the second switch;
   a third low-noise amplifier that is arranged on the second main surface and connected to the third filter via the second switch;
   a fourth filter with a passband including the second communication band;
   a fourth low-noise amplifier that is arranged on the second main surface and connected to the fourth filter;
   a third switch connected to the first antenna connection terminal and the second antenna connection terminal; and
   a second conductive member arranged between the third low-noise amplifier and the fourth low-noise amplifier on the second main surface, wherein
   the first filter, the second filter, the third filter, and the fourth filter are connected to the first antenna connection terminal and the second antenna connection terminal via the third switch.

9. The radio frequency module of claim 8, wherein
the second filter and the fourth filter are formed as one chip as a multiplexer, and
the third switch has a first terminal and a second terminal connected to the first antenna connection terminal and the second antenna connection terminal, respectively, a third terminal and a fourth terminal connected to the first filter and the third filter, respectively, and a fifth terminal connected to the multiplexer.

10. The radio frequency module of claim 9, wherein
the multiplexer is a surface acoustic wave (SAW) filter.

11. The radio frequency module of claim 8, wherein
the third filter is an LC filter.

12. The radio frequency module of claim 8, wherein
the third filter is arranged on one of the first main surface and the second main surface, and
the fourth filter is arranged on the other one of the first main surface and the second main surface.

13. The radio frequency module of claim 8, wherein
the fourth filter is arranged on the first main surface, and
a footprint of the fourth filter overlaps a footprint of the fourth low-noise amplifier in a plan view of the module substrate.

14. The radio frequency module of claim 8, wherein
the second filter is arranged on the first main surface, and
a footprint of the second filter overlaps a footprint of the third switch in a plan view of the module substrate.

15. The radio frequency module of claim 8, wherein
the fourth filter is arranged on the first main surface, and
a footprint of the fourth filter overlaps a footprint of the third switch in a plan view of the module substrate.

16. The radio frequency module of claim 8, wherein
the first communication band is band n77 for 5th Generation New Radio (5GNR), and
the second communication band is band n79 for 5GNR.

17. A communication apparatus comprising:
a signal processing circuit that processes a radio frequency signal; and
a radio frequency module configured to transmit the radio frequency signal between the signal processing circuit and an antenna, wherein
the radio frequency module includes
a module substrate with a first main surface and a second main surface on opposite sides of the module substrate;
a first filter with a passband including a first communication band for time division duplex (TDD);
a first switch connected to the first filter;
a first power amplifier arranged on the first main surface and connected to the first filter via the first switch;
a first low-noise amplifier that is arranged on the second main surface and connected to the first filter via the first switch;
a second filter with a passband including the first communication band;
a second low-noise amplifier that is arranged on the second main surface and connected to the second filter; and
a first conductive member arranged between the first low-noise amplifier and the second low-noise amplifier on the second main surface.

18. A radio frequency module comprising:
a module substrate;
a first filter with a passband including a first communication band for time division duplex (TDD);
a first switch connected to the first filter;
a first power amplifier arranged on a first surface of the module substrate and connected to the first filter via the first switch;
a first low-noise amplifier that is arranged a second surface of the module substrate and connected to the first filter via the first switch;
a second filter with a passband including the first communication band; and
a second low-noise amplifier arranged on the second surface of the module substrate and connected to the second filter.

19. The radio frequency module of claim 18, wherein
the second filter is arranged on the one of the first main surface and the second main surface, and
a footprint of the second filter overlaps a footprint of the second low-noise amplifier in a plan view of the module substrate.

20. The radio frequency module of claim 18, further comprising:
a conductive member arranged between the first low-noise amplifier and the second low-noise amplifier on the second surface of the module substrate.

* * * * *